US011803221B2

(12) United States Patent
Calugaru et al.

(10) Patent No.: US 11,803,221 B2
(45) Date of Patent: Oct. 31, 2023

(54) AI POWER REGULATION

(71) Applicant: Microsoft Technology Licensing, LLC, Redmond, WA (US)

(72) Inventors: Vlad Radu Calugaru, Kirkland, WA (US); Andres Felipe Hernandez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 797 days.

(21) Appl. No.: 16/827,029

(22) Filed: Mar. 23, 2020

(65) Prior Publication Data

US 2021/0294403 A1 Sep. 23, 2021

(51) Int. Cl.
*G06F 1/28* (2006.01)
*G06N 3/04* (2023.01)
*G06N 3/08* (2023.01)
*G06N 3/044* (2023.01)

(52) U.S. Cl.
CPC .............. *G06F 1/28* (2013.01); *G06N 3/044* (2023.01); *G06N 3/08* (2013.01)

(58) Field of Classification Search
CPC .......... G06F 1/28; G06N 3/0445; G06N 3/08; H02J 2203/20; H02J 3/003; Y02E 60/00; Y04S 10/50; Y04S 40/20
See application file for complete search history.

(56) References Cited

U.S. PATENT DOCUMENTS 8,706,652 B2    4/2014  Yang et al.
9,187,093 B1 *  11/2015 Sujan .................... B60W 30/14
10,387,810 B1 * 8/2019  Kalush ............. G06Q 10/06311
10,402,733 B1 * 9/2019  Li ........................... G06N 20/20
(Continued)

FOREIGN PATENT DOCUMENTS

CN    105045367 A    11/2015
CN    108919938 A    11/2018
WO    2018095802 A1   5/2018

OTHER PUBLICATIONS

"International Search Report & Written Opinion Issued in PCT Application No. PCT/US21/015599", dated Apr. 1, 2021, 10 Pages.
(Continued)

*Primary Examiner* — Xuxing Chen
(74) *Attorney, Agent, or Firm* — Holzer Patel Drennan

(57) ABSTRACT

An electronic device includes an AI power controller that predicts future load transients within a system and that dynamically alters power settings in anticipation of the predicted future load transients. To predict a future load transients, the AI power controller receives as an input application signature data from an application executing on the device. The application signature data includes at least media frame data generated by the application during a time interval. The AI power controller executes logic to compare the received application signature data to historical application signature data, where the historical application signature data includes media frame data generated by the application during one or more past execution instances of the application. Based on the comparison, the AI power controller predicts a load transient of the application at a future point in time and dynamically adjusts a power control setting of the device in anticipation of the predicted load transient.

20 Claims, 6 Drawing Sheets

(56) References Cited

U.S. PATENT DOCUMENTS

| | | | |
|---|---|---|---|
| 10,884,636 B1* | 1/2021 | Abrol | G06F 3/0631 |
| 11,113,120 B1* | 9/2021 | Greenfield | G06F 9/4881 |
| 2008/0201591 A1 | 8/2008 | Hu et al. | |
| 2010/0025483 A1 | 2/2010 | Hoeynck et al. | |
| 2010/0177247 A1 | 7/2010 | Sekulovski et al. | |
| 2012/0254399 A1* | 10/2012 | Komeda | G06F 9/5083 |
| | | | 709/224 |
| 2013/0278590 A1* | 10/2013 | Brabenac | G09G 5/005 |
| | | | 345/214 |
| 2014/0095422 A1* | 4/2014 | Solomon | G06N 5/02 |
| | | | 706/46 |
| 2014/0244191 A1 | 8/2014 | Oka et al. | |
| 2014/0317427 A1 | 10/2014 | Hill | |
| 2016/0249290 A1* | 8/2016 | Ambapuram | H04W 52/0229 |
| 2017/0237289 A1* | 8/2017 | Thompson | H02J 3/003 |
| | | | 700/296 |
| 2018/0255350 A1* | 9/2018 | Rumreich | H04N 21/8456 |
| 2019/0115753 A1* | 4/2019 | Sheehan | G05B 13/0265 |
| 2019/0311201 A1* | 10/2019 | Selinger | G08B 13/19656 |
| 2020/0043223 A1* | 2/2020 | Lei | G06T 15/205 |
| 2020/0225473 A1* | 7/2020 | Selan | G02B 27/0093 |

OTHER PUBLICATIONS

Chen, et al., "Learning-Directed Dynamic Voltage and Frequency Scaling Scheme with Adjustable Performance for Single-Core and Multi-Core Embedded and Mobile Systems", In Journal of Sensors, Sep. 12, 2018, pp. 1-25.

Mei, et al., "A Survey and Measurement Study of GPU DVFS on Energy Conservation", In Journal of Digital Communications and Networks, vol. 3, Issue 2, May 2017, pp. 89-100.

Tarsa, et al., "Workload Prediction for Adaptive Power Scaling Using Deep Learning", In Proceedings of IEEE International Conference on IC Design & Technology, May 28, 2014, 5 Pages.

* cited by examiner

AI POWER REGULATION

BACKGROUND

Power control systems in electronics devices are typically reactive to system load changes. The load exhibits an action (e.g., demand of current due to increase or decrease in load), and power controller performs some action to ensure that the voltage at the load source remains stable Voltage converters may react to changes in load in different ways based on their respect control architectures, but may, for example, implement actions such as altering the switching frequency in a switching power supply or by increasing pulse width modulation (PWM) on-time to deliver more energy to the load without compromising voltage levels. The most power-efficient power controllers are those that can react to changes in load the fastest by providing the quickest response to transient loads to keep the voltage at the load near the setpoint.

To help stabilize voltage at the load source, many systems include significant bulk capacitors near loads that exhibit high load transients. However, bulk capacitors consume already-limited circuit board surface area and add to system manufacturing costs. Additionally, depending on the load profile, achieving a target energy storage and impedance profile may limit peak loading below target levels if reliant on bulk capacitors. In other systems, power systems may inefficiently run certain component(s) at higher power than necessary most of the time in order to prevent system brown-outs.

SUMMARY

According to one implementation, an AI power controller uses current load patterns that are stored in memory of an electronic device to predict load transients of an application and to allocate power within the electronic device in anticipation of the predicted load transients. To generate a prediction, the AI power controller receives as input application signature data from the application at a time while the application is executing on the device. The AI power controller executes logic that compares the received application signature data to historical application signature data, where the received application signature data includes at least media frame data generated by the application in the current execution instance and where the historical application signature data includes media frame data generated by the application during one or more past execution instances of the application. The AI power controller predicts a load transient of the application at a future point based on the comparison and dynamically adjusts a power control setting of the device in anticipation of the predicted load transient.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology includes a power controller that uses artificial intelligence (AI) to predict changes in system loads on a device before those changes occur. The power controller dynamically adjusts power control settings of the device, such as voltage or current supply, based on the predicted load changes. By anticipating rather than reacting to system load changes, the power controller may be able to more efficiently reserve power, such as by keeping the device or its respective components in a lower power state until just before an increase in load is anticipated. Likewise, the power controller's ability to predict load transients allows for anticipatory actions that eliminate or mitigate the need for bulk decoupling capacitors.

In some instances, increased or decreased processing activity of an application may temporally correlate with the generation and rendering of certain media data (e.g., graphics or sound) generated by the application. In the example of a video game, an increase in processing load may predictably occur in relation to the presentation of certain graphics on a user's display. For example, the game may launch a particular high-memory animation sequence when a user's avatar takes some action, such as walking through or opening a particular door. Likewise, a video streaming application may draw additional current from the power supply when presenting certain graphics-intensive scenes of a particular movie on a user's display. In still other non-gaming applications with graphical user interfaces (GUIs), a user's selection of a particular tool on a GUI may serve to initiate a memory-intensive processing task.

The various power controllers disclosed herein are trained using artificial intelligence (AI) to leverage observable correlations between media affects (e.g., graphics, sound) produced by an application and load transients of the application to dynamically predict changes in load that an electronics device may experience due to ongoing execution of a particular application. In one implementation, an AI power controller disclosed herein is trained to predict load transients attributable to a currently-executing application based on information generated during previous execution instances of the same application, such as previously-generated graphics and learned temporal associations between those graphics and previously-observed power profiles (e.g., current/time profiles, voltage/time profiles).

Figure 1:
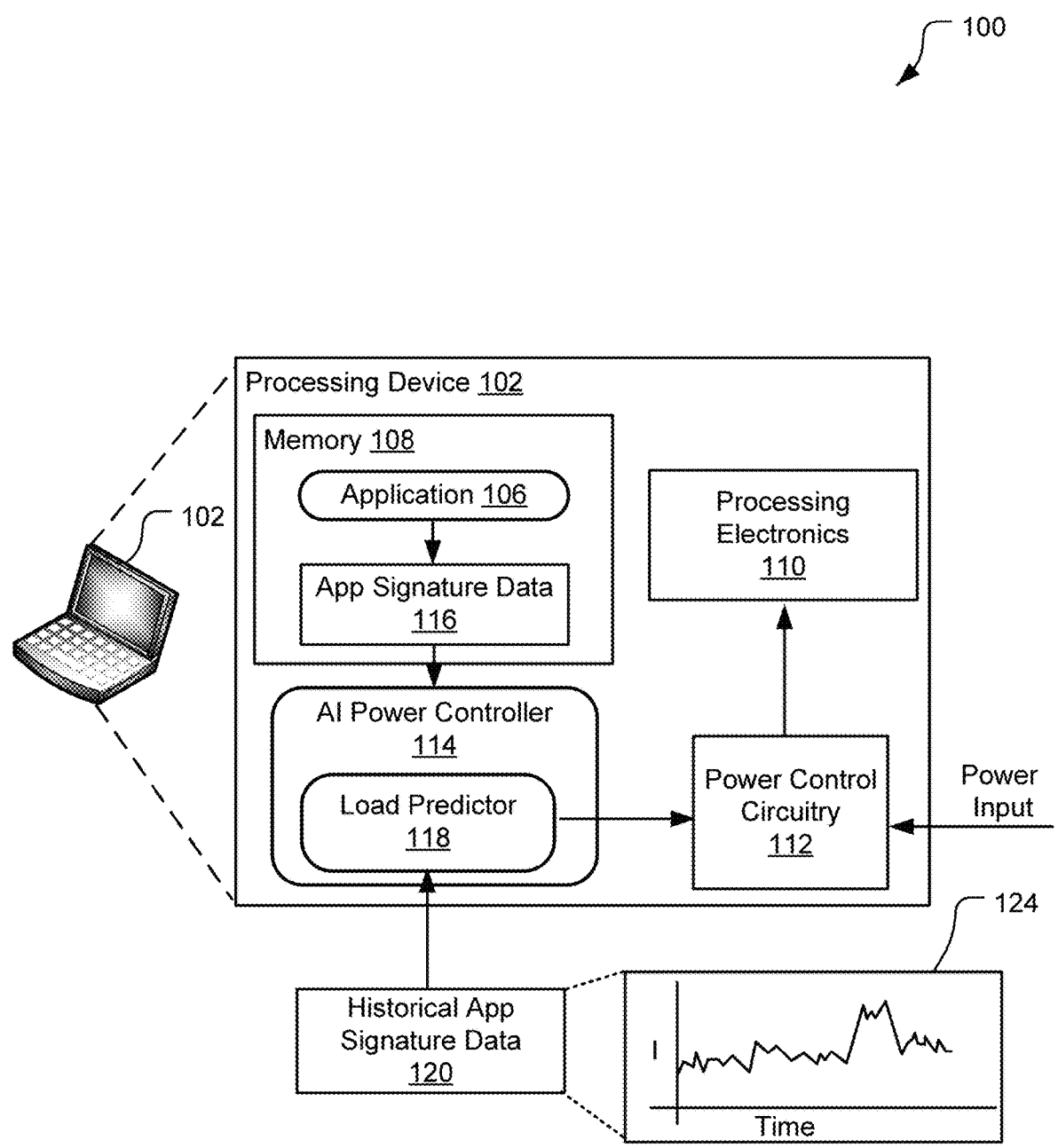
FIG. 1 illustrates an example system that utilizes an AI power controller to dynamically adjust power control settings of a processing device in anticipation of predicted load transients generated by a currently-executing application.

FIG. 1 illustrates an example system 100 that utilizes an AI power controller 114 to dynamically adjust power control settings of a processing device 102 in anticipation of predicted load transients generated by a currently-executing application 106. The processing device 102 is shown to be a laptop but may, in different implementations, assume a variety of forms including without limitation that of a mobile phone, tablet, smart watch, desktop computer, cloud-based server, etc. The processing device 102 includes at least memory 108 storing an operating system (not shown) and one or more applications, such as the application 106, that are locally executable, at least in part, by processing electronics 110 (e.g., one or more CPUs, GPUs, etc.).

The processing device 102 further includes an AI power controller 114 that includes computer-executable instructions executable by the one or more processing electronics 110 to selectively control power control circuitry 112 to alter power available to different load-drawing components (e.g., the processing electronics 110 and the memory 108) throughout ongoing system operations. As used herein, the term "power control" is intended to refer to actions that control the provisioning of voltage, current, or both to various load-drawings electronics within the processing device 102.

In various implementations, the AI power controller 114 may implement different types of power control actions to regulate power available to various load-drawing electronics (processing electronics 110 and memory 108) of the system. In one implementation, the power control circuitry 112 includes a switching frequency power supply that is controllable to alter the average value of voltage fed to the processing electronics 110 and/or the memory 108 by turning a switch between the supply and the load on and off at a fast rate. The longer the switch is on compared to the off periods, the higher the total power supplied to the load. For example, the AI power controller 114 may selectively control the power control circuitry 112 to alter switching frequency or total pulse width modulation (PWM) on-time to deliver more energy to the load as needed without compromising voltage levels.

In another implementation, the AI power controller 114 generates control signals received by the power control circuitry 112 to regulate the power state of one or more integrated circuit (IC) chips, processing electronics 110, or subsystems of the processing device 102. For example, the power control circuitry 112 may regulate a power state of a system-on-chip (SoC) or GPU by selecting between different setpoints predefined in a power allocation table.

Although some traditional processing devices include various types of power controllers, traditional power control systems are generally "reactive" in the sense that such systems implement actions responsive to observed changes in system loads rather than in anticipation of an observed change. For example, traditional power controllers are designed to wait until a transient load is detected and, in response, perform some action to keep the voltage at the load at a predefined setpoint.

In the system 100, however, the AI power controller 114 includes a load predictor 118 adapted to intelligently predict load transients attributable to the application 106 while the application is executing but before associated load changes are detectable. In this manner, the AI power controller 114 can dynamically implement actions to preemptively adjust settings of the power control circuitry 112 in anticipation of load transients at or very near (e.g., within microseconds) of actual future times when those load transients occur. For example, the AI power controller 114 may implement various power control actions without waiting for the load to change.

According to one implementation, the AI power controller 114 receives application signature data 116 for the application 106 at a time while the application 106 is actively executing and rendering graphics on the processing device 102. As used herein, the term "application signature data" refers to data generated by an application (e.g., graphics data, sound data, log data) and/or system data indicating how execution of a particular application affects system resources (e.g., current/time profiles or voltage/time profiles for the application).

In one implementation, the AI power controller 114 receives application signature data 116 that includes media frame data generated by the application 106 during the ongoing execution instance of the application 106. As used herein, "media frame data" refers to frames of graphics and/or sound data produced by an application. For example, the AI power controller 114 may request media frame data generated by the application 106 at one or more times (e.g., upon launch of the, periodically, etc.) while the application 106 is actively executing on the processing device 102. The requested and received media frame data may include graphics data and/or sound data generated over a recent interval, such as the past few seconds (e.g., 3 seconds, 5 seconds, etc.).

In another implementation, the application signature data 116 includes current/time and/or voltage/time profile information for the application 106. For example, the application signature data 116 may include current/time (di/dt) profile representing current consumption of the application over a recent time interval, such as the past few seconds (e.g., 3 seconds, 5 seconds, etc.). In some implementations, the application signature data 116 includes current/time profile and temporally-associated media frame data (e.g., corresponding to the same time interval). In other implementations, the application signature data 116 includes media frame data generated by the application but does not including corresponding current/time profile information. In yet still other implementations, the application signature data 116 includes current/time profile information and does not include media frame data.

The load predictor 118 is, in FIG. 1, a machine learning model trained to generate load predictions based on learned correlations between the received application signature data 116 and historical application signature data 120. For example, the load predictor 118 may be trained on a dataset of the historical application signature data 120 including media frame data generated during past instances of execution of the application 106 and/or current/time profiles (e.g., a historical current/time profile 124) corresponding to those past instances of execution.

Responsive to receipt of the application signature data 116 (e.g., data generated and received during a present execution instance of the application 106), the load predictor 118 applies logic learned from its training based on the historical application signature data 120 to effectively compare the received application signature data to the historical application signature data 120 and, on that basis, predict future changes in system load due to the ongoing execution of the application 106. The AI power controller 114 then dynamically alters settings of the power control circuitry 112 to efficiently allocate system power resources in accord with the predicted load fluctuations.

Figure 2:
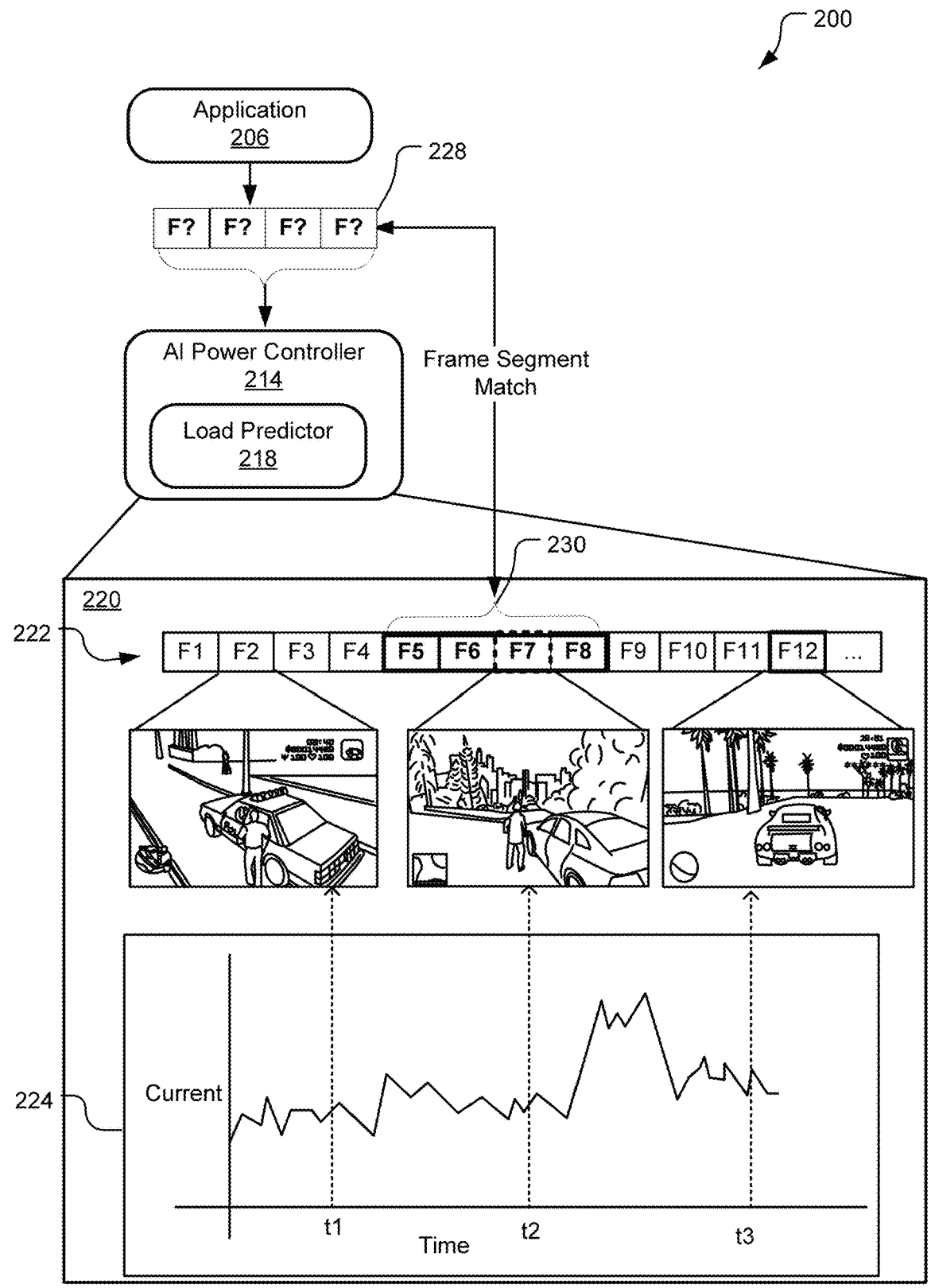
FIG. 2 illustrates another example system that utilizes an AI power controller to dynamically adjust power control settings of a processing device in anticipation of predicted load transients attributable to execution of an application.

FIG. 2 illustrates another example system that utilizes an AI power controller 214 to dynamically adjust power control settings of a processing device (not shown) in anticipation of predicted load transients attributable to execution of an application 206. The AI power controller 214 includes a load predictor 218 that may include features the same or similar to those described above with respect to the load predictor 118 of FIG. 1. The system 200 is shown predicting a load transient of the application 206 at a future point in time according to one methodology.

While the application 206 is executing, the AI power controller 214 receives application signature data from the application 206. The application signature data includes at least a frame segment 228 (or multiple segments) of media frame data generated by the application 206 during the ongoing execution instance of the application 206. According to one implementation, the frame segment 228 is a time-sequential segment of media frames generated by the application 206. For example, the segment may be a video or audio stream generated by the application over some interval, such as the past few seconds. The frame segment 228 may be provided to the AI power controller 214 in various ways in different implementations such as upon request or at predefined intervals (e.g., every 5 seconds). In some implementations, the application signature data received from the application 206 includes other information in addition to media frame data (e.g., the frame segment 228). For example, the received application signature data may also include a current/time (di/dt) profile for the application 206 that spans some subinterval of the current execution instance of the application 206, such as the current/time profile for the past 1 minute, 5 minutes, etc.

The AI power controller 214 provides the frame segment 228 to a load predictor 218 which is, one implementation, a machine learning model trained on a dataset including or consisting of historical application signature data 220 for the application 206. For simplicity of illustration, the historical application signature data 220 is shown to include a single consecutive sequence of frames (F1-F12) of historical media frame data 222 along with a corresponding di/dt profile 224. However, it is to be understood that the historical application signature data 220 may actually include many (e.g., hundreds, thousands, or tens of thousands) of consecutive sequences of media frames generated during different prior execution instances of the application 206. Each consecutive sequence of media frames (e.g., the sequence F1-F12) may be stored in association with a respective current/time profile (e.g., the di/dt profile 224) indicating current consumed by the application 206 during a past time interval corresponding to the associated consecutive sequence of media frames. In some implementations, the historical application signature data 220 includes one or more voltage/time profiles (dV/dt) in lieu of or in addition to the di/dt profiles described with respect to FIG. 2.

In the example shown, the di/dt profile 224 corresponds to the same time interval in which the application 206 generated the exemplary consecutive sequence of media frames F1-F12. By example and without limitation, the di/dt profile 224 indicates three times t1, t2, and t3 that correspond precisely to the times that frames F2, F7, and F12 were generated by the application 206. Notably, the sequences of media frames and corresponding di/dt profiles in the historical application signature data 220 may vary significantly with respect to different execution instances of the application 206. However, given a large enough training set of the historical application signature data 220, the load predictor 218 is able to identify correlations between certain media frame characteristics and observed load transients. For example, a video game may, at a certain point, present the same or similar graphics (e.g., a scene, an object) just before the onset of a particular graphics sequence driving a marked increase in processing load. Therefore, by training the load predictor 218 on hundreds or thousands of media frame sequences and their associated di/dt profiles, the load predictor 218 may be taught to associate certain media characteristics (graphics and/or audio) with changes in load that statistically correlate to those media characteristics in some manner.

In the example of FIG. 2 the frame segment 228 is to be understood as being a segment that is both generated and provided to the AI power controller (as shown) while the application 206 is concurrently executing on the electronics device. The load predictor 218 analyzes the received frame segment 228, such as by using one or more of a variety of image recognition techniques, to identify similarities between the frames of the frame segment 228 and one or more frames within the historical application signature data 220. For example, the load predictor 218 may determine that the received frame segment 228 of media frame data satisfies predefined similarity criteria (e.g., a similarity greater than a predefined threshold) with respect to a frame segment 230 of the historical media frame data 222. In addition, the load predictor 218 may determine that the received frame segment 228 satisfies the predefined similarity criteria with respect to other stored frame segments and sequences as well.

After identifying a subset of frames within the historical application signature data 220 satisfying the predefined similarity criteria with respect to the received frame segment 228, the load predictor 218 analyzes the associated di/dt profile information (e.g., the di/dt profile 224) to identify a temporal position within the di/dt profile corresponding to generation of the identified subset of frames. For example, the load predictor 218 determines, based on the assessment of the predetermined similarity criteria, that there exists a relative match between the received frame segment 228 and the identified frames F5-F8 in the historical frame data corresponds to a time t2 in the di/dt profile 224. Based on this determination (alone or in conjunction with similar determinations with respect to many different stored sequences of historical media frame data), the load predictor 218 may then determine a likelihood of observing a load transient of predefined magnitude within some future time interval, such as within the next 5 seconds. For example, the load predictor 218 may determine that, based on the identified relative match between the frame segment 228 and the frame segment 230 and one or more other segments of the historical application signature data, there exists a 85% likelihood that the application 206 will experience an increase in processing load above a defined threshold within 5 seconds. In this scenario, the AI power controller 214 may implement logic to preemptively respond to the predicted load transient at the future time, such as by increasing PWM on-time or switching frequency of a power supply.

Figure 3:
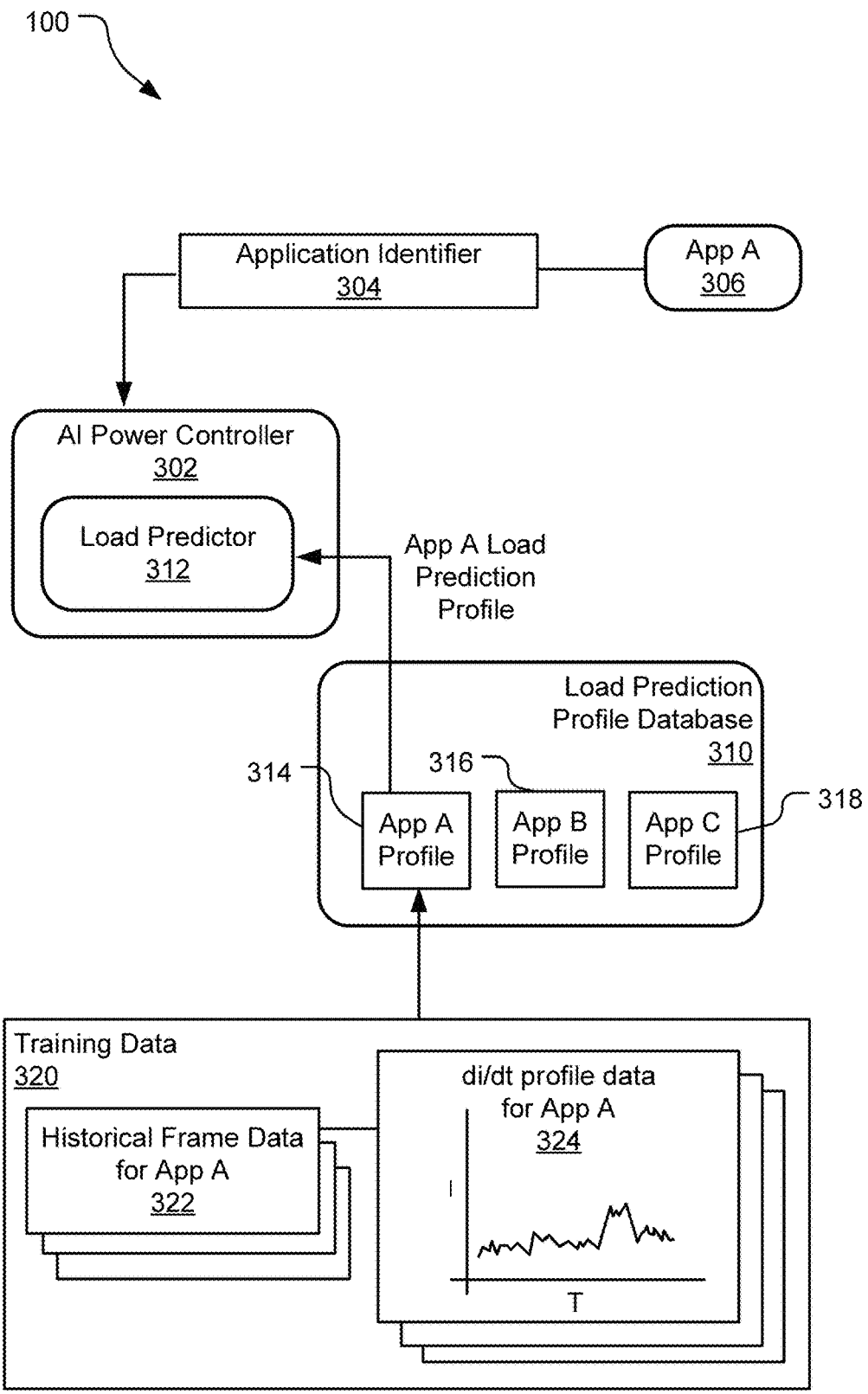
FIG. 3 illustrates aspects of an intelligent power control system that predicts system load transients and that dynamically adjusts power control settings of an electronic device in anticipation of the predicted system load transients.

FIG. 3 illustrates aspects of an intelligent power control system 300 that predicts system load transients and that dynamically adjusts power control settings of an electronic device in anticipation of the predicted system load transients. The intelligent power control system 300 includes an AI power controller 302 with a load predictor 312. Specific characteristics of the AI power controller 302 or load predictor 312 not specifically described below may be understood as being the same or similar to like-name components described with respect to FIGS. 1 and 2.

Responsive to launch of an application (e.g., App A 306) on the electronic device, the AI power controller 302 obtains (e.g., via request or otherwise) an application identifier 304 identifying the application 306. Using the application identifier 304, the AI power controller 302 retrieves an application-specific power prediction profile (e.g., App A profile 314, App B profile 316, or App C profile 318) for the application 306 from a load prediction profile database 310. Each application-specific power prediction profile 314 in load prediction profile database 310 may be understood as being a machine learning model trained on a dataset consisting of historical application signature data for the associated application (e.g., App A, App B, App C). For example, the power prediction profile 314 for App A may be understood as being a fully-trained machine learning model adapted to execute logic derived throughout a supervised training process in which the model was provided with training data 320 including historical frame data 322 for various historical execution instances of App A and corresponding historical di/dt profile data 324. In another implementation, the training data 320 includes historical frame data 322 for and corresponding voltage/time (dV/dt) profile data instead of or in addition to the di/ti profile data.

In different implementations, the application-specific power prediction profiles (e.g., App A profile 314, App B profile 316, App C profile 318) may be generated using one or more different machine learning algorithms including, for example, supervised training algorithms such as linear regression, decision trees, random forest models, adaboost models, gradient boosting tree models, simple neural networks, recurrent neural networks, etc.

In different implementations, the load prediction profile database 310 may be stored either locally within the electronic device with the AI power controller 302 or remote from the electronic device, such as within a cloud-based server. In one implementation, the load prediction profile database 310 is locally maintained on the electronic device. For example, the AI power controller 302 may obtain each application-specific power prediction profile a single time and locally store and manage such data thereafter. In other implementations, the load prediction profile database 310 is a cloud-based server that the AI power controller 302 frequently re-queries, such as each time a new application is launched on the electronic device.

In different implementations, the load predictor 312 selectively retrieves the application-specific load prediction profile for a given application at different times. For example, the load predictor 312 may query the load prediction profile database 310 with the application identifier 304 each time the application 206 launches, periodically, or responsive to various trigger events, such as when the corresponding application (App A) is initially downloaded, installed, or updated. If, for example, App A is an application download from the internet, the load predictor 312 may receive the application-specific load prediction profile 314 as metadata that is downloaded along with the application data.

The load predictor 312 may, in some implementations, be adapted to simultaneously execute different load prediction profile models (e.g., 314, 316, 318) to predict and loads generated by multiple co-executing applications so as to enable the AI power controller 302 to dynamically adapt power control settings to manage such loads.

Figure 4:
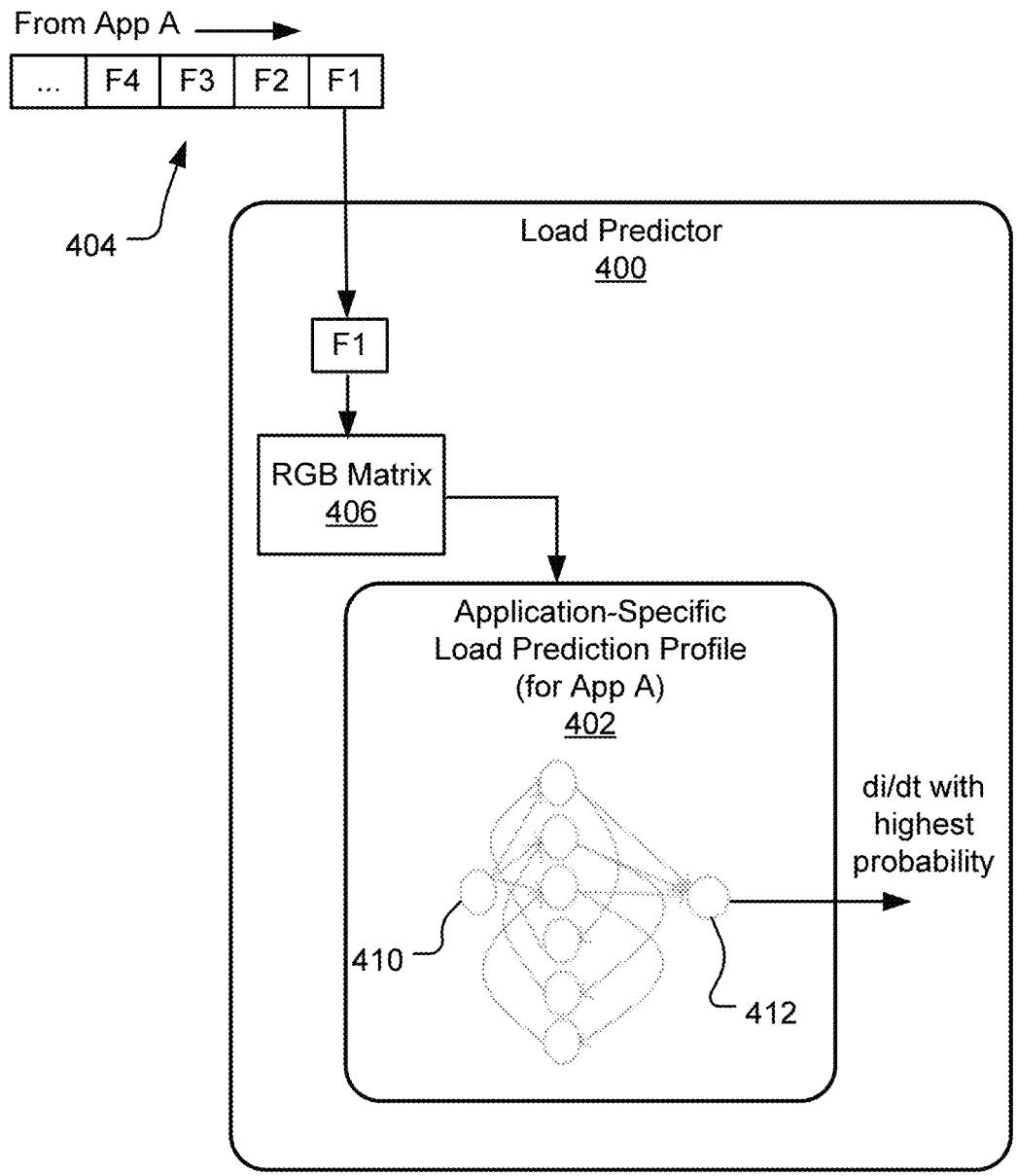
FIG. 4 illustrates one example of a load predictor that uses an application-specific load prediction profile to predict future load transients attributable to processing activities of a currently-executing application.

FIG. 4 illustrates one example of a load predictor 400 that uses an application-specific load prediction profile 402 to predict future load transients attributable to processing activities of a currently-executing application. The application-specific load prediction profile 402 is initially generated during a training process in which a machine learning model is provided with training data including historical application signature data for a particular application, App A. For example, the training data may include video streams previously-generated by App A and associated di/dt profile information for App A during time intervals corresponding to the video streams.

In the example of FIG. 4, the application-specific power prediction profile 402 is a recurrent neural network (RNN) formed by nodes interconnected by edges that form a directed graph along a temporal sequence. During a prediction phase (e.g., post-training), the load predictor 400 receives as input a sequence 404 of media frames (e.g., a subset of a video stream) generated by App A. This sequence 404 is both generated by App A and received by the load predictor 400 during a same execution instance of App A (e.g., while App is currently executing).

The load predictor 400 converts each frame of the sequence 404 to a red, green, blue (RGB) matrix (e.g., an RGB matrix 406) and, in turn, sequentially inputs each frame to an input node 410 of the application-specific load prediction profile 402. The input node annotates the RGB matrix with metadata indicative of an index position within the sequence 404 that the frame corresponds to. By comparing the received RGB matrices and indexed temporal positioning information to training data that includes similarly-indexed positioning information for thousands of RGB matrix sequences and associated di/dt profile data, the load predictor 400 determines a probability of observing a particular di/dt that at a future point in time following the sequence 404. The load predictor provides the di/dt with the highest occurrence probability to an output node 412, and the predicted load transient (e.g., the di/dt information) is, in turn, provided to a voltage or current regulator (not shown).

Figure 5:
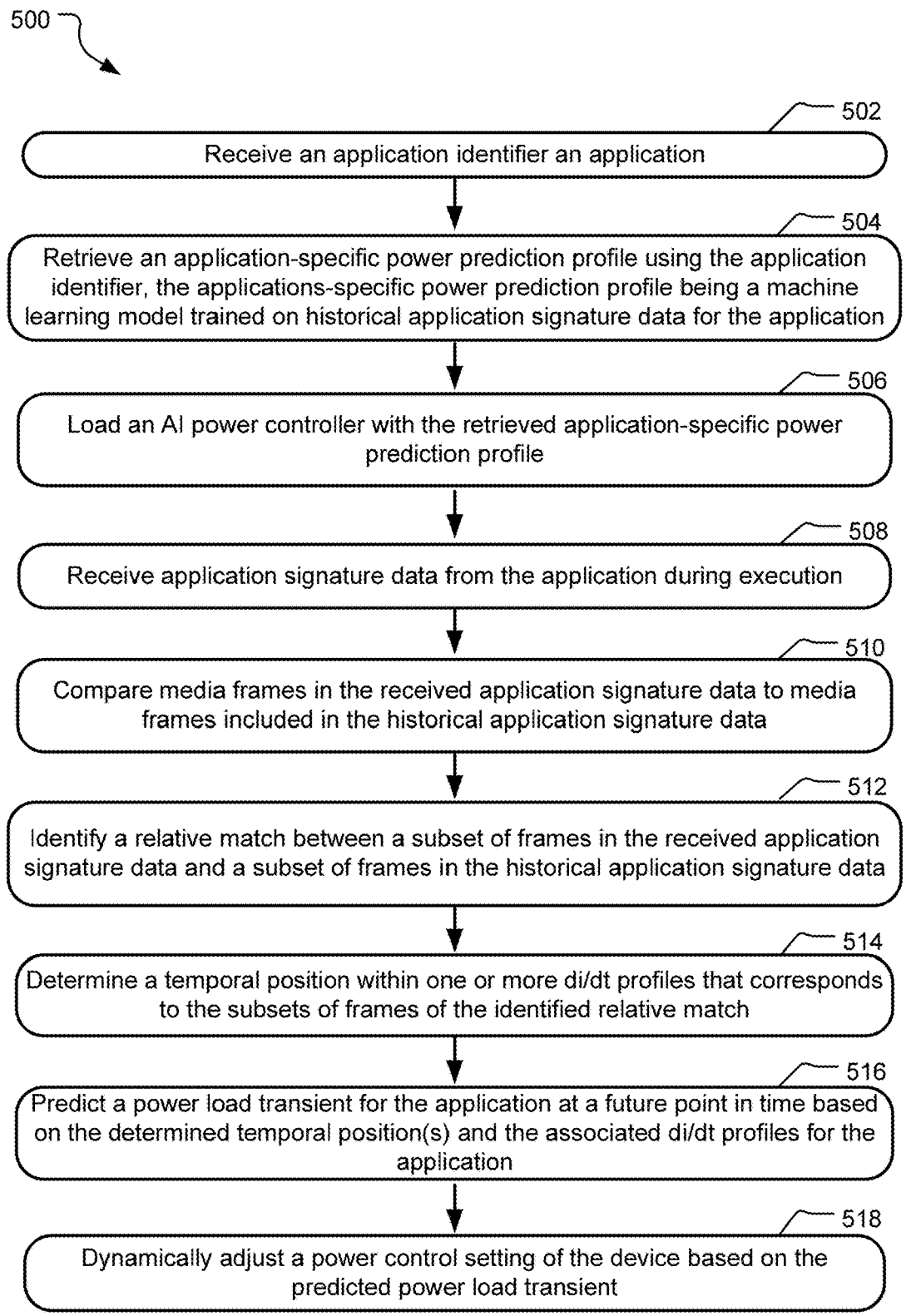
FIG. 5 illustrates example operations 500 for dynamically allocating power in an electronic device based on predicted future load transients attributable to individual applications.

FIG. 5 illustrates example operations 500 for dynamically allocating power in an electronic device based on predicted future load transients attributable to individual applications. A retrieval operation 502 receives an application identifier for an application responsive to initiation of a launch sequence for the application. A retrieval operation 502 uses the received application identifier to retrieve an application-specific power prediction profile for the application. For example, the retrieval operation 502 may download the application-specific power prediction profile from an online database and/or retrieve the application-specific power profile from local storage. The application-specific power prediction profile is a machine learning model trained on historical application signature data for the application. For example, the application-specific power prediction profile is an RNN or other machine learning model trained on sequences of media frame data historically-generated by the application and historical power profile information for the application corresponding to the time intervals in which the sequences of media frame data were generated.

A loading operation 506 loads an AI power controller with the retrieved application-specific power prediction profile for the application. An receiving operation 508 receives application signature data from the application and provides the application signature data as input to the retrieved application-specific power prediction profile. For example, the application may provide application signature data to the AI power controller periodically during ongoing execution of the application. The application signature data includes at least one sequence of media frames generated by the application. For example, the AI power controller may receive a new sequence of frames generated by the application on a continuous, rolling basis such as a every 1 second, 3 seconds, etc.

A comparing operation 510 executes logic to effectively compare media frames included in the received application signature data to media frames included in the historical application signature data that was used to train the application-specific power prediction profile. In one implementation, the historical application signature data includes both media frame data generated previously by the application (e.g., during thousands of past instances of execution) along with associated power profile information.

A match identifier operation 512 identifies a relative frame match between a subset of the media frames in the historical application signature data and a subset of the media frames received in the application signature data from the application. In one implementation, the relative frame match is identified when the subsets of frames satisfy predefined similarity criteria relative to one another, such as by demonstrating certain visual similarities with respect to objects, shading, tonal profile features, etc.

An index position determination operation 514 determines a temporal position within one or more current/time (di/dt) profiles corresponding to the media frame(s) of historical application signature data included in the frame match. A prediction operation 516 predicts, based on the di/dt profiles and the determined temporal position(s), a load transient that is most likely to be observed at a predefined future point in time. A power adjustment operation 518 dynamically adjusts a power control setting of the electronic device in anticipation of the predicted load transient at the predefined future point in time. For example, the power adjustment operations 518 may alter a device power mode or alter the PWM on-time or switching frequency just prior to predicted load transient.

Figure 6:
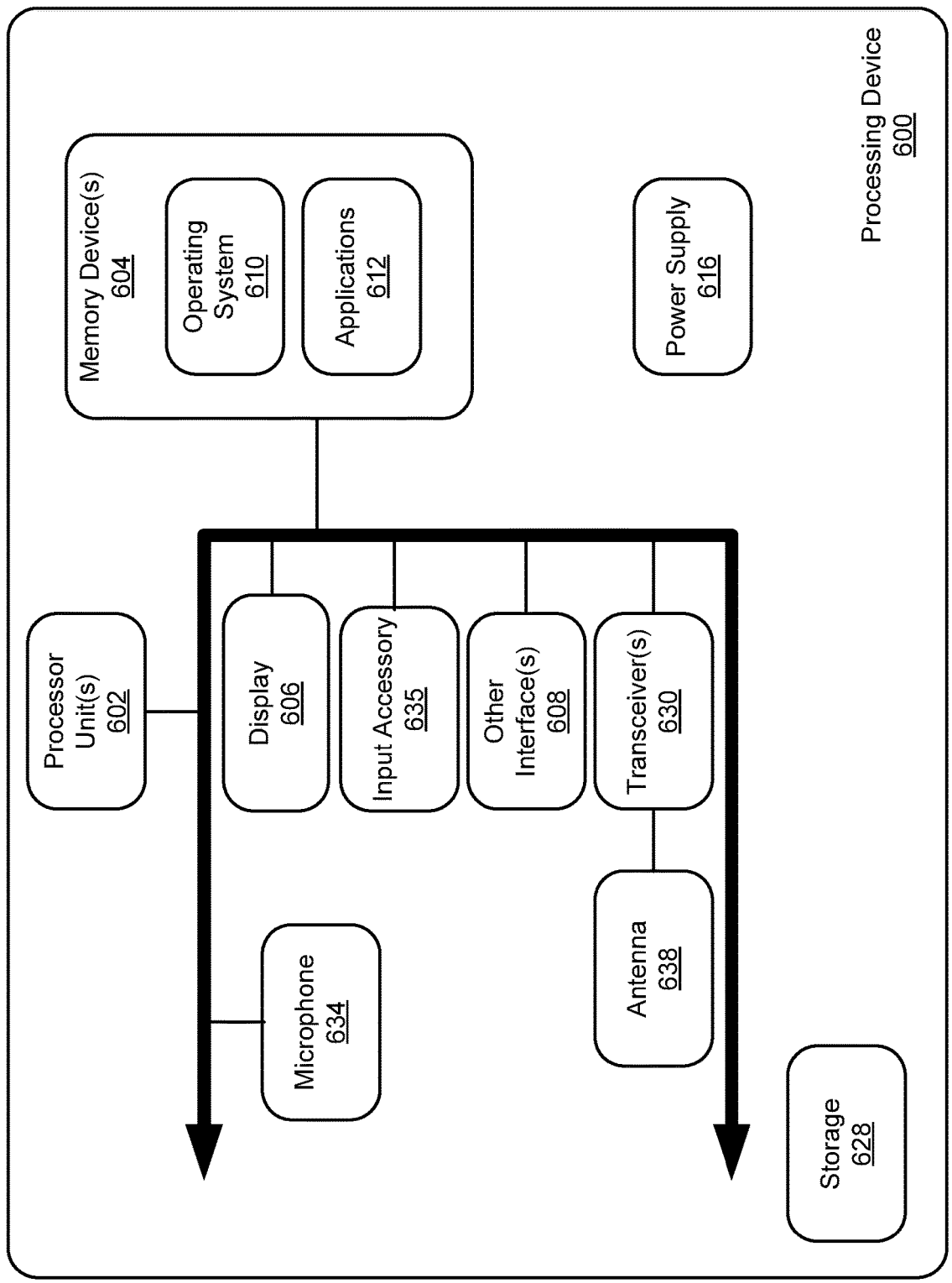
FIG. 6 illustrates an example schematic of a processing device suitable for implementing aspects of the disclosed technology.

FIG. 6 illustrates an example schematic of a processing device 600 suitable for implementing aspects of the disclosed technology. The processing devices 600 includes one or more processor unit(s) 602, memory device(s) 604, a display 606, and other interfaces 608 (e.g., buttons). The processor unit(s) 602 may each include one or more CPUs, GPUs, etc.

The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, may resides in the memory 604 and be executed by the processor unit(s) 602, although it should be understood that other operating systems may be employed.

One or more applications 612 are loaded in the memory 604 and executed on the operating system 610 by the processor unit(s) 602. Applications 612, such as an AI power controller, may receive inputs from one another as well as from various input local devices such as a microphone 634, input accessory 635 (e.g., keypad, mouse, stylus, touchpad, gamepad, racing wheel, joystick), and a camera 632. Additionally, the applications 612 may receive input from one or more remote devices, such as remotely-located smart devices, by communicating with such devices over a wired or wireless network using more communication transceivers 630 and an antenna 638 to provide network connectivity (e.g., a mobile phone network, Wi-Fi®, Bluetooth®). The processing device 600 may also include one or more storage devices 628 (e.g., non-volatile storage). Other configurations may also be employed.

The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example device disclosed herein includes an AI power controller configured to: receive application signature data from an application executing on the device, execute logic that compares the received application signature data to historical application signature data, predict a load transient of the application at a future point in time relative to the time interval based on the comparison; and dynamically adjust a power control setting of the device in anticipation of the predicted load transient. The application signature data includes media frame data generated by the application during a time interval; and the historical application signature data includes media frame data generated by the application during one or more past execution instances of the application;

In one example device according to any preceding device, the historical application signature data includes time/current profiles corresponding to one or more past execution instances of the application.

In another example device of any preceding device, the AI power controller is further executable to: identify a frame match between one or more frames of the media frame data included in the historical application signature data and one or more frames of the media frame data included in the received application signature data; determine a temporal position within one or more stored current/time profiles that corresponds to the identified one or more frames in the frame match; and predict the load transient of the application based on the determined temporal position and the stored current/time profiles for the application.

In yet another example of any preceding device, the AI power controller uses a recurrent neural network (RNN) trained on the historical application signature data to predict the load transient at the future point in time.

In yet still another example device of any preceding device, the RNN executes logic to determine a probability of observing each of multiple different load transients at the future point in time and outputs a load transient with a highest determined probability as the predicted load transient.

In yet still another example device of any preceding device, the AI power controller is further configured to receive an application identifier for the application, use the application identifier to retrieve an application-specific power prediction profile for the application identified by the application identifier, and execute logic of the application-specific power prediction profile to predict the load transient of the application at the future point in time.

In yet still another device of any example device, the application-specific power prediction profile is a machine learning model trained on a dataset consisting of historical application profile signature data for the application identified by the application identifier, the historical application profile signature data including current/time profiles in association with the media frame data generated by the application during one or more past execution instances of the application.

An example method disclosed herein provides for receiving application signature data from an application executing on a device, comparing the received application signature data to historical application signature data, predicting a load transient of the application at a future point in time relative to the time interval based on the comparison; and dynamically adjusting a power control setting of the device in anticipation of the predicted load transient. The application signature data includes media frame data generated by the application during a time interval, and the historical application signature data includes media frame data generated by the application during one or more past execution instances of the application.

In yet another example method of any preceding method, the historical application signature data includes time/current profiles corresponding to one or more past execution instances of the application.

Yet still another example method of any preceding method further provides for identifying a frame match between one or more frames of the media frame data included in the historical application signature data and one or more frames of the media frame data included in the received application signature data; determining a temporal position within one or more stored current/time profiles that corresponds to the identified one or more frames in the frame match; and predicting the load transient of the application based on the determined temporal position of the frame match and the stored current/time profiles for the application.

In still another example method of any preceding method, a recurrent neural network (RNN) trained on the historical application signature data for the application. predicts the load transient at the future point in time.

In yet still another example method of any preceding method, the RNN determines a probability of observing each of multiple different load transients at the future point in time and outputs a load transient with a highest determined probability as the predicted load transient.

In still another example method of any preceding method, the method further includes receiving an application identifier for the application; using the application identifier to retrieve an application-specific power prediction profile for the application identified by the application identifier, and executing logic of the application-specific power prediction profile to predict the load transient of the application at the future point.

In another example method of any preceding method, the application-specific power prediction profile is a machine learning model trained on a dataset consisting of historical application profile signature data for the application identified by the application identifier, the historical application profile signature data including current/time profiles in association with the media frame data generated by the application during one or more past execution instances of the application.

An example computer-readable storage media disclosed herein encodes instructions for executing a computer process that comprises receiving application signature data from an application executing on a device; predicting, with a load prediction profile, a load transient of the application at a future point in time relative to the time interval; and dynamically adjusting a power control setting of the device in anticipation of the predicted load transient. The application signature data includes media frame data generated by the application during a time interval, and the load prediction profile is a machine learning model trained on a dataset including historical application signature data including media frame data generated by the application during one or more past execution instances of the application.

In another example computer process of any preceding computer process, the historical application signature data includes one or more time/current profiles each associated with a subset of the media frame data generated by the application during one or more past execution instances of the application.

In still another example computer process of any preceding computer process, the load prediction profile is a trained recurrent neural network (RNN).

In still another example computer process of any preceding computer process, the trained RNN determines a probability of observing each of multiple different load transients at the future point in time and outputs a load transient with a highest determined probability as the predicted load transient.

In yet another example computer process of any preceding computer process, the computer process further comprises receiving an application identifier for the application; and using the application identifier to retrieve the load prediction profile.

In yet still another example computer process computer process of any preceding computer process, the load prediction profile is trained on a dataset consisting of historical application signature data for the application identified by the application identifier, the historical application signature data including current/time profiles in association with the media frame data generated by the application during one or more past execution instances of the application.

An example system disclosed herein includes a means for receiving application signature data from an application executing on a device; a means for comparing the received application signature data to historical application signature data, a means for predicting a load transient of the application at a future point in time relative to the time interval based on the comparison; and a means for dynamically adjusting a power control setting of the device in anticipation of the predicted load transient. The application signature data includes media frame data generated by the application during a time interval, and the historical application signature data includes media frame data generated by the application during one or more past execution instances of the application.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A device comprising:
   an AI power controller configured to:
   receive application signature data from an application executing on the device, the application signature data including media frame data generated by the application during a time interval;
   execute logic that compares the received application signature data to historical application signature data, the historical application signature data including media frame data generated by the application during one or more past execution instances of the application;
   predict a load transient of the application at a future point in time relative to the time interval based on the comparison; and
   dynamically adjusts a power control setting of the device in anticipation of the predicted load transient.

2. The device of claim 1, wherein the historical application signature data includes profile data corresponding to one or more past execution instances of the application, the profile data including at least one of current/time profile data and voltage/time profile data.

3. The device of claim 1, wherein the AI power controller is further configured to:
   identify a frame match between one or more frames of the media frame data included in the historical application signature data and one or more frames of the media frame data included in the received application signature data;
   determine a temporal position within one or more stored current/time profiles that corresponds to the identified one or more frames in the frame match; and
   predict the load transient of the application based on the determined temporal position and the stored current/time profiles for the application.

4. The device of claim 3, wherein the AI power controller uses a recurrent neural network (RNN) to predict the load transient at the future point in time, the RNN being trained on the historical application signature data.

5. The device of claim 4, wherein the RNN executes logic to determine a probability of observing each of multiple different load transients at the future point in time and outputs a load transient with a highest determined probability as the predicted load transient.

6. The device of claim 4, wherein the AI power controller is further executable to:
   receive an application identifier for the application;
   use the application identifier to retrieve an application-specific power prediction profile for the application identified by the application identifier, and
   execute logic of the application-specific power prediction profile to predict the load transient of the application at the future point in time.

7. The device of claim 6, wherein the application-specific power prediction profile is a machine learning model trained on a dataset consisting of historical application profile signature data for the application identified by the application identifier, the historical application profile signature data including current/time profiles in association with the media frame data generated by the application during one or more past execution instances of the application.

8. A method comprising:
   receiving application signature data from an application executing on a device, the application signature data including media frame data generated by the application during a time interval;
   comparing the received application signature data to historical application signature data, the historical application signature data including media frame data generated by the application during one or more past execution instances of the application;
   predicting a load transient of the application at a future point in time relative to the time interval based on the comparison; and
   dynamically adjusting a power control setting of the device in anticipation of the predicted load transient.

9. The method of claim 8, wherein the historical application signature data includes time/current profiles corresponding to one or more past execution instances of the application.

10. The method of claim 8, further comprising:
    identifying a frame match between one or more frames of the media frame data included in the historical application signature data and one or more frames of the media frame data included in the received application signature data;

determining a temporal position within one or more stored profiles that corresponds to the identified one or more frames in the frame match, the one or more stored profiles including at least one of current/time profiles and voltage/time profiles; and predicting the load transient of the application based on the determined temporal position of the frame match and the stored profiles for the application.

11. The method of claim 10, wherein a recurrent neural network (RNN) predicts the load transient at the future point in time, the RNN being trained on the historical application signature data for the application.

12. The method of claim 10, wherein the RNN determines a probability of observing each of multiple different load transients at the future point in time and outputs a load transient with a highest determined probability as the predicted load transient.

13. The method of claim 10, further comprising:
receiving an application identifier for the application;
using the application identifier to retrieve an application-specific power prediction profile for the application identified by the application identifier, and
executing logic of the application-specific power prediction profile to predict the load transient of the application at the future point.

14. The method of claim 13, wherein the application-specific power prediction profile is a machine learning model trained on a dataset consisting of historical application profile signature data for the application identified by the application identifier, the historical application profile signature data including current/time profiles in association with the media frame data generated by the application during one or more past execution instances of the application.

15. One or more tangible computer-readable storage media encoding instructions for executing a computer process comprising:
receiving application signature data from an application executing on a device, the application signature data including media frame data generated by the application during a time interval;
predicting, with a load prediction profile, a load transient of the application at a future point in time relative to the time interval, the load prediction profile being a machine learning model trained on a dataset including historical application signature data including media frame data generated by the application during one or more past execution instances of the application; and
dynamically adjusting a power control setting of the device in anticipation of the predicted load transient.

16. The one or more tangible computer-readable storage media of claim 15, wherein the historical application signature data includes one or more time/current profiles each associated with a subset of the media frame data generated by the application during one or more past execution instances of the application.

17. The one or more tangible computer-readable storage media of claim 15, wherein the load prediction profile is a trained recurrent neural network (RNN).

18. The one or more tangible computer-readable storage media of claim 17, wherein the trained RNN determines a probability of observing each of multiple different load transients at the future point in time and outputs a load transient with a highest determined probability as the predicted load transient.

19. The one or more tangible computer-readable storage media of claim 17,
receiving an application identifier for the application; and
using the application identifier to retrieve the load prediction profile.

20. The one or more tangible computer-readable storage media of claim 19, wherein the load prediction profile is trained on a dataset consisting of historical application signature data for the application identified by the application identifier, the historical application signature data including current/time profiles in association with the media frame data generated by the application during one or more past execution instances of the application.

* * * * *